US006829391B2

(12) United States Patent
Comaniciu et al.

(10) Patent No.: US 6,829,391 B2
(45) Date of Patent: Dec. 7, 2004

(54) ADAPTIVE RESOLUTION SYSTEM AND METHOD FOR PROVIDING EFFICIENT LOW BIT RATE TRANSMISSION OF IMAGE DATA FOR DISTRIBUTED APPLICATIONS

(75) Inventors: Dorin Comaniciu, Highland Park, NJ (US); Visvanathan Ramesh, Plainsboro, NJ (US); Fabio Berton, Finale Ligure (IT)

(73) Assignee: Siemens Corporate Research, Inc., Princeton, NJ (US)

( * ) Notice: Subject to any disclaimer, the term of this patent is extended or adjusted under 35 U.S.C. 154(b) by 596 days.

(21) Appl. No.: 09/944,316

(22) Filed: Aug. 31, 2001

(65) Prior Publication Data

US 2002/0064314 A1 May 30, 2002

Related U.S. Application Data

(60) Provisional application No. 60/231,029, filed on Sep. 8, 2000.

(51) Int. Cl.[7] .................................................. G06K 9/36
(52) U.S. Cl. ...................................... 382/243; 382/232
(58) Field of Search ............................... 382/243, 232; 348/400.1; 345/427

(56) References Cited

U.S. PATENT DOCUMENTS 5,103,306 A * 4/1992 Weiman et al. .......... 348/400.1
6,252,989 B1 * 6/2001 Geisler et al. .............. 382/232

OTHER PUBLICATIONS

Comanicius et al., "Robust Detection and Tracking of Human Faces with an Active Camera", IEEE Third International Worksho on Visual Surveillance, Jul. 2000, pps. 11–18.*
Comanicius te al. "Real–Time Tracking of Non–Rigid Objects Using Mean Shift", IEEE Conference on Computer Vision and Pattern Recognition, vol. 2, Jun. 2000, pps. 142–149.*

* cited by examiner

Primary Examiner—Anh Hong Do
(74) Attorney, Agent, or Firm—Donald B. Paschburg; F. Chau & Assoiciates, LLP (57) ABSTRACT

A client-server system and method that enables efficient, low bit rate transmission of image data over a network from an image server (e.g., active cameras) to a client for, e.g., distributed surveillance. A detection and tracking module detects a human presence within an observation area and provides 2-dimensional face coordinates and its estimated scale to a video transmission module. The captured video is then efficiently encoded in log-polar coordinates using an adaptive log-polar mapping, with a foveation point centered on the face. A fovea region, which covers the target object (face), is uniformly sampled and transmitted at full resolution to the client. The periphery region (background) is sampled according to a log-polar grid. To compensate for bit rate variations due to the changes in the scale of the target object and/or bandwidth of the communication channel, the resolution of the periphery region is modified through an adaptive log-polar mapping process, so as to maintain a virtually constant transmission rate from the server to the client. The high resolution of the data in the fovea region enables efficient recognition and/or identification of the transmitted video.

20 Claims, 5 Drawing Sheets

ADAPTIVE RESOLUTION SYSTEM AND METHOD FOR PROVIDING EFFICIENT LOW BIT RATE TRANSMISSION OF IMAGE DATA FOR DISTRIBUTED APPLICATIONS

CROSS-REFERENCE TO RELATED APPLICATION

This application claims priority from U.S. patent application Ser. No. 60/231,029, filed on Sep. 8, 2000, which is fully incorporated herein by reference.

TECHNICAL FIELD OF THE INVENTION

The present invention relates generally to a system and method for intelligent processing of visual data for low bandwidth communication. More specifically, the present invention relates to a client-server system for remote and distributed processing of image data over a communication network using an adaptive resolution protocol that enables image data to be transmitted with high resolution at a virtually constant low bit rate over the network.

BACKGROUND

The autonomous processing of visual information for the purpose of efficient description and transmission of the main events and data of interest, represents the new challenge for next generation video surveillance systems. The advances in the new generation of intelligent cameras having local processing capabilities (either supporting Java applications and/or based on DSP chips), will make possible the customization of such devices for various applications requiring specific video understanding and summarization tasks. Such applications may require mechanisms for efficient encoding and transmission of video data in a distributed environment. Indeed, protocols for providing low bit rate transmission of image data will allow, for example, wireless transmission of data of interest to a central processing unit, for further processing, and/or retransmission, in system implementations such as video surveillance, videoconferencing and industrial monitoring.

Accordingly, systems and methods that enable bandwidth reduction for efficient transmission of video data over a communication network are highly desirable.

SUMMARY OF THE INVENTION

The present invention is directed to client-server architecture and protocol that enables efficient transmission of visual information in real-time from a network of image servers (e.g., active cameras) to a central processing unit (client application). The client-server system may advantageously be employed in any application requiring efficient real-time processing and transmission of video data in a very low bit rate. For example, the invention may be used for remote and distributed surveillance applications, videoconferencing, or industrial inspection systems, etc.

In one aspect of the invention, a method for encoding image data for transmission over a communication channel comprises the steps of:

receiving image data;

encoding the image data using an adaptive log-polar mapping protocol that generates a log-polar representation of the image data comprising a fovea region and periphery region, wherein the encoding comprises selecting encoding parameters for the log-polar mapping based on either the size of the fovea, the channel bandwidth, or both, to modify the resolution of the image data within the periphery region; and transmitting the image data within the fovea region at full resolution and the image data within the periphery region at the modified resolution.

In another aspect, the log-polar mapping parameters are dynamically modified, in real-time, to adjust the transmission resolution of the image data within the periphery region, if necessary, to compensate for a bit rate variation due to either a change in the size of the fovea region, the bandwidth of the communication channel or both, so as to maintain the transmission bandwidth of the encoded image data at a substantially constant rate.

Preferably, the encoding process utilizes a log-polar sampling grid comprising a hexagonal lattice framework.

In another aspect of the invention, the step of selecting encoding parameters comprises accessing predetermined encoding parameters stored in a LUT (look-up table) based on a radius measure of the fovea region.

In yet another aspect of the invention, a method for providing distributed surveillance over a communications network comprises the steps of:

detecting the presence of an individual in a predetermined field of view;

tracking the face of the individual within the field of view;

generating image data, the image data comprising two-dimensional coordinates and estimated scale of the individual's face being tracked;

filtering and sampling the image data using a log-polar mapping to generate encoded image data comprising a fovea region and periphery region, the fovea region being centered on the face of the individual; and transmitting the encoded image data over a communication channel at a predetermined transmission bit rate, the fovea region being transmitted at full resolution;

wherein the log-polar mapping of the periphery region is adapted based on scale and locations changes of the fovea region to substantially maintain the predetermined transmission bit rate.

In another aspect, a client/server system comprises an image sever which is operatively interfaced to a camera. The image server comprises an encoder for filtering and sampling image data received from the camera using a log-polar mapping to generate encoded image data comprising a fovea region and periphery region, the fovea region being centered on a target of interest in the image. The image server further comprises a communication stack for transmitting the encoded image data over a communication channel at a predetermined bit rate, wherein the fovea region is transmitted at full resolution, and wherein the log-polar mapping of the periphery region is adapted based on scale and locations changes of the fovea region to substantially maintain the predetermined transmission bit rate. The system further comprises a client for receiving the encoded image data transmitted from the image server and decoding the encoded image data for identification of the target of interest.

These and other objects, features and advantages of the present invention will be described or become apparent from the following detailed description of preferred embodiments, which is to be read in connection with the accompanying drawings.

DETAILED DESCRIPTION OF PREFERRED EMBODIMENTS

It is to be understood that the system modules and method steps described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM, etc.), and executable by any device or machine comprising suitable architecture. It is to be further understood that since the system modules and method steps depicted in the accompanying Figures are preferably implemented in software, the actual connections between the system modules and the flow of the process steps may differ depending upon the manner in which the present invention is programmed. Given the teachings herein, one of ordinary skill in the related art will be able to contemplate these and similar implementations or configurations of the present invention.

I General Overview

The present invention is directed to client-server architecture and protocol that enables efficient transmission of visual information in real-time from a network of image servers (e.g., active cameras) to a central processing unit (client application). The client-server system may advantageously be employed in any application requiring efficient real-time processing and transmission of video data in a very low bit rate. For example, the invention may be used for remote and distributed surveillance applications, as illustrated by the exemplary embodiments described below. Other applications include, e.g., videoconferencing, wherein face detection and tracking is implemented with an active camera, or industrial inspection systems, etc.

Figure 1:
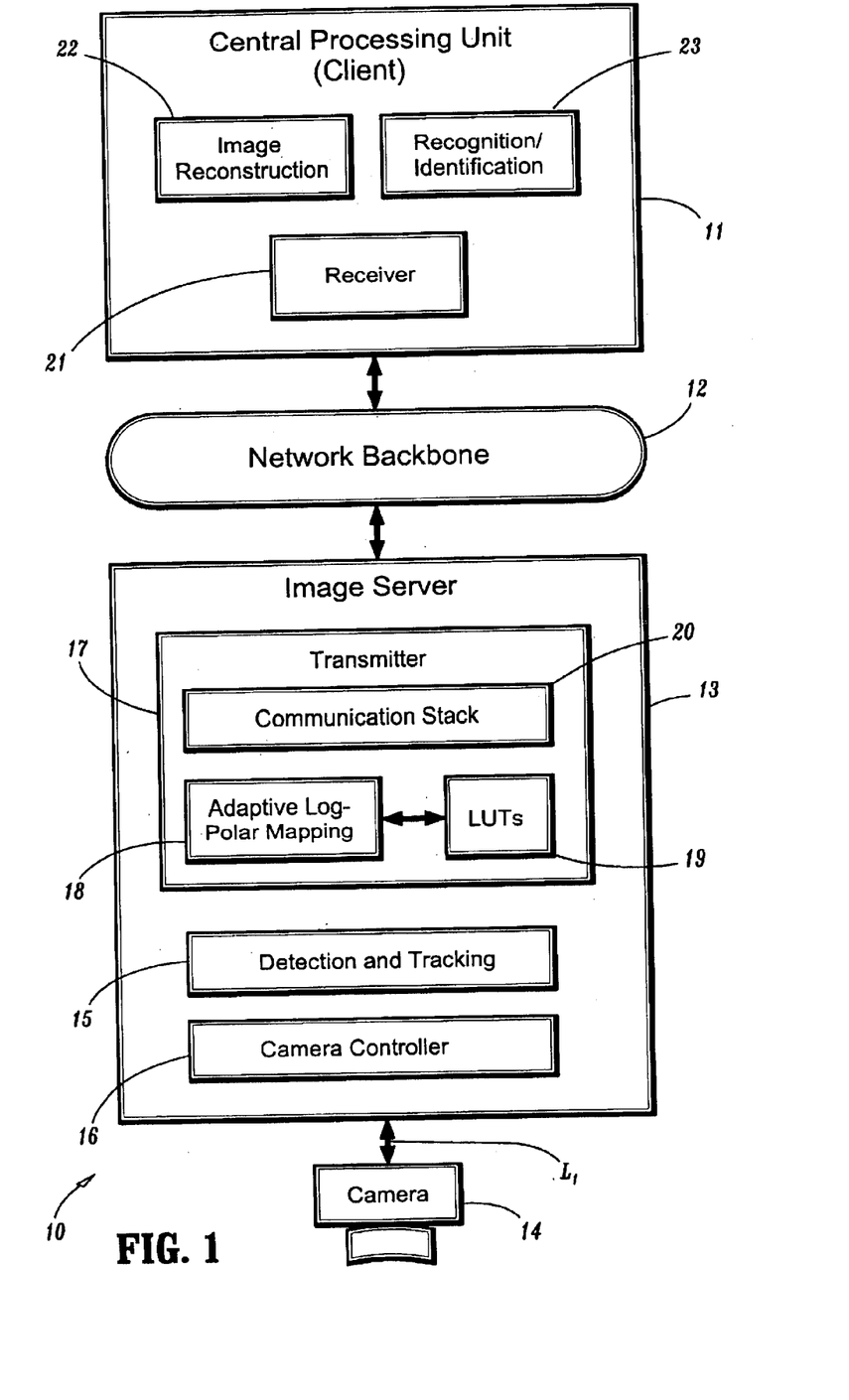
FIG. 1 is a block diagram of a client-server system for processing image data according to an embodiment of the present invention.

Referring now to FIG. 1, a block diagram illustrates a client-server system for processing image data according to an embodiment of the invention. The exemplary embodiment of FIG. 1 comprises a real-time foveation system for remote and distributed surveillance. The client-server system 10, which preferably comprises a Java™-based architecture, enables efficient transmission of events and data of interest from a network of cameras to a central processing unit.

More specifically, the system 10 comprises a central processing unit (client application) 11 that is connected (via network 12) to one or more video data collection systems comprising an image server 13 and a camera device 14. The image server 13 operatively communicates with the camera 14 via interface L1 using any suitable interface such as the RS-232C interface standard. The camera 14 preferably comprises any Java-based intelligent (active) camera such as the SonyEVI-D30 camera. The network 12 may comprise any communication network such as a wireless network, LAN (local area network), WAN (wide area network), and/or other communication network such as the Internet that uses IP (internet protocol). Further, it is readily apparent to those skilled in the art that although one image server 13, camera 14 and client 11 are depicted in FIG. 1, the system 10 may comprise any number of clients, servers and cameras, depending on the application.

In accordance with the invention, the image server 13 comprises a detection and tracking module 15, a camera controller 16, and a transmission module 17. The transmitter 17 comprises an adaptive log-polar mapping module 18, a set of LUTs (Look-Up tables) 19 that store encoding parameters, and a communication stack 20. The detection and tracking module 15 reports to the client central processing unit 11 whenever a target of interest (e.g., human) is present in an observational field of view of the camera 14. During the tracking process, the camera controller 16 is responsive to signals from the detection and tracking module 15 to provide the adequate control of the pan, tilt, and zoom of the camera 14 to track the target image (e.g., human face). A more detailed description of a preferred framework for the detection and tracking module 15 is provided below.

In the exemplary surveillance application, the detection and tracking module 15 generates a 2-D pixel image representation of a captured image and provides the 2-D coordinates of the face of a detected individual, as well as its estimated scale, to the adaptive log-polar mapping module 18. Then, prior to transmission over the network 12, the video data is filtered and encoded by the mapping module 18 using an adaptive log-polar mapping protocol, with a foveation point centered about the target image (e.g., human face). In a preferred embodiment, an adaptive log-polar mapping protocol comprises, for example, anti-aliasing filtering, sampling and interpolation. The encoding process uniformly samples data in the fovea region of the log-polar representation (thereby providing high resolution of the target image), whereas the image data in the periphery region is sampled according to a log-polar grid (thereby sacrificing resolution in the background). In other words, the resolution of the background data decreases as the scale of the target image (fovea region) increases.

An adaptive log-polar mapping protocol according to the present invention is designed to deal with scale and location changes of the target face, while maintaining the required bit rate in real time. More specifically, for a given bandwidth and/or fovea size, a corresponding set of LUTs 19 is accessed by the encoder 18 to obtain the input parameters that are used for performing the anti-aliasing filtering, sampling and interpolation processes. The adaptive log-polar mapping module 18 processes the data in the periphery region of the image using the parameters. Further details of a preferred adaptive log-polar mapping framework are provided below.

The communication stack 20 employs any suitable communication protocol based on, e.g., RTP (real-time protocol), or a suitable streaming media protocol, to separately transmit the fovea and periphery regions of the image.

The client 11 comprises a receiver 21 for receiving and demodulating the transmitted data, an image reconstruction module 22 that performs the inverse mapping process of the adaptive log-polar mapping encoder 18 to reconstruct the video data. Further, the client 11 optionally comprises a recognition/identification module 23 that processes the reconstructed image data to identify the target of interest. For example, in the exemplary surveillance system, the module 23 may comprise any suitable face biometric identification technique for identifying the individual based on facial features.

It is to be understood that the system 10 may use any suitable compression and decompression protocol in the server 13 and client 11, respectively, to transmit compressed image data prior to transmission over the network 12 and decompress the encoded data upon arrival at the client 11.

Advantageously, as explained in detail below, a preferred sampling grid that is used to compute the log-polar representation comprises an architecture that enables improved efficiency of the encoded image representation over conventional methods. Consequently, the present invention enables the high-resolution, quasi-losses (real-time) transmission of the fovea region and, hence, efficient application of image reconstruction 18 and recognition/identification 19 at the client central processing unit 11.

Preferred frameworks and protocols for components of the system 10 will now be discussed in greater detail.

I. Color Based Face Detection and Tracking

It is to be appreciated that any detection and tracking system that provides robust detection and tracking of target image (human face) may be employed herein. In a preferred embodiment, the detection and tracking module 15 of human faces employs the techniques described in U.S. patent application Ser. No. 09/503,991, filed on Feb. 14, 2000, entitled "REAL-TIME TRACKING OF NON-RIGID OBJECTS USING MEAN SHIFT," which is commonly assigned and incorporated herein by reference, and in the articles "Real-time Tracking of Non-Rigid Objects using Mean Shift," *IEEE Conf. On Comp. Vis. and Pat. Rec.*, Hilton Head Island, S.C., Vol. 2, 142–149, 2000; and "Robust Detection and Tracking of Human Faces with An Active Camera," by D. Comaniciu, et al., *IEEE Int'l Workshop on Visual Surveillance*, Dublin, Ireland, 11–18, 2000.

With the preferred method, the color model of a human face (face models) is obtained from a given subject, by computing the mean histogram of the face instances recorded in the morning, afternoon, and at night. In addition, the color models are preferably obtained under outdoor and indoor illumination conditions. The histograms are preferably computed in the intensity normalized RG space with 128×128 bins.

As a dissimilarity measure between the face model and the face candidates, a metric based on the Bhattachaaryya coefficient is employed. Hence, the problem of face localization is reduced to a metric minimization, or equivalently to the maximization of the Bhattacharyya coefficient between two color distributions. By including spatial information into the color histograms, the maximization of the Bhattacharyya coefficient is equivalent to maximizing a density estimate. As a consequence, the well-known gradient ascent mean shift procedure could be employed to guide a fast search for the best face candidate in the neighborhood of a given image location.

Advantageously, the resulting optimization achieves convergence in only a few iterations, being thus well suited for the task of real-time detection and tracking. To adapt to the scale changes of the target, the scale invariance property of the Bhattacharyya coefficient is exploited as well as the gradient information on the border of the hypothesized face region.

Preferably, the detection process involves the mean shift optimization with multiple initializations, each one in a different location of the current image frame. The initializations are determined such that there is at least one initial location in the basin of attraction of a face of typical size, randomly located in the image.

The tracking process involves only optimizations in the neighborhood of the previous face location estimate and is therefore sufficiently fast to run comfortably at the frame rate on a standard PC (personal computer). As a result, the module that implements the log-polar mapping receives for each frame two vectors representing the estimated position and scale of the currently observed face.

III. Log-polar Mapping

The log-polar representation of image data is mainly inspired by the primate visual system that reduces the enormous amount of available data through a non-uniformly sampled retina. The field of view is divided into a region of maximal resolution called the fovea and a region whose resolution decreases towards the extremities called the periphery. In accordance with the present invention, the fovea region, which covers the target object, is uniformly sampled, whereas the periphery region, which covers the background, is sampled according to a log-polar grid. Using this method, as shown below, the detected region of interest (target image) from a current image frame can be transmitted with high resolution and approximately constant bit rate. To compensate for bit rate variations due to the changes in the target scale and/or bandwidth of the communication channel, the representation quality of the background is modified through an adaptive log-polar mapping process.

A. Implementation

The adaptive log-polar mapping module 18 is preferably implemented in software, wherein additional hardware can be used to achieve virtually frame rate performance (such as described in the article by M. Bolduc, M. D. Levine, "*A Real-Time Foveated Sensor with Overlapping Receptive Fields,*" *Real-time Imaging*, 3:195–212, 1997.)

Notwithstanding that conventional space-variant sensors can be used that implement (in CCD technology) the mapping between the Cartesian and log-polar plane, or that specific lens systems can be used to obtain non-uniform resolution (as discussed for example in the article by C. W. Shin, S. Inokushi, "A New Retina-Like Visual Sensor Performing the Polar Transform," *IAPR Workshop on Machine Vision Applications*, Kawasaki, Japan, 52–56, 1994), a major drawback of these approaches, however, is that the parameters of the data reduction are fixed depending on the physical design. In contrast, the present invention provides an adaptive log-polar mapping process that can be dynamically modified in real-time to adjust the transmission resolution of the periphery region based on the bandwidth of the communication channel that is not used for transmitting (in full resolution) the fovea region, thereby achieving virtually constant bandwidth transmission, irrespective of scale changes in the target (tracked) image and/or channel bandwidth.

B. Filtering

The adaptive log-polar mapping module 18 employs anti-aliasing and interpolation filters for the log-polar sampling process. In the case of polar sampling, it is known that a real function $f(\rho,\theta)$ whose Fourier Transform is of compact support can be reconstructed from its equally spaced samples in the θ direction and at the normalized zeros of Bessel functions of the first kind, in the ρ direction. One known application of the sampling theorem in polar coordinates is for direct Fourier reconstruction in computer tomography. Since the measurement data has a Fourier transform represented in polar coordinates, the idea is to use the sampling theorem to precisely interpolate from the polar to then Cartesian grid, then, apply the Inverse Fast Fourier Transform to obtain the data in the time domain.

The Fourier Transform formulation is not valid, however, when the mapping is space-variant, such as with log-polar mapping according to the present invention. Although conventional methods exist that provide fast reconstruction from non-uniform samples (see, e.g., H. G. Feichtinger, K. Grochenig, T. Strohmer, "Efficient Numerical Methods in Non-Uniform Sampling Theory," *Numberische Mathematik*, 69:423–440, 1995), their efficiency is not desirable for real-time applications. Note that a frequency domain representation can be constructed by applying the log-polar mapping directly to the Fourier integral. The result is the Exponential Chirp Transform, which has been shown to preserve the shift-invariant properties of the usual Fourier transform (see, e.g., G. Bonmassar, E. L. Schwartz, "Space-Variant Fourier Analysis: The Exponential Chirp Transform," *IEEE Trans. Pattern Analysis Machine Intell.*, 19(10): 1080–1089, 1997.)

In a preferred embodiment, anti-aliasing filtering in the case of log-polar sampling is based on a conventional method of using position-dependent Gaussian filters with a disk-shaped support region with exponentially growing radius size (as described in the article by M. Bolduc, M. D. Levine, "A Real-Time Foveated Sensor with Overlapping Receptive Fields," *Real-time Imaging*, 3:195–212, 1997.)

C. Adaptive Log-Polar Mapping

An adaptive log-polar mapping protocol according to an embodiment of the present invention will now be discussed in detail. Assume that $(\chi,\gamma)$ denotes the Cartesian coordinates, with the origin assumed to be in the center of the image, and by $(\rho,\theta)$ the polar coordinates. The transformation between Cartesian and polar grid is then defined by the pair:

$$\begin{cases} \rho = \sqrt{\chi^2 + \gamma^2} \\ \theta = \arctan \gamma/\chi \end{cases} \quad (1)$$

and $$\begin{cases} \chi = \rho\cos\theta \\ \gamma = \rho\sin\theta \end{cases} \quad (2)$$

Figure 2:
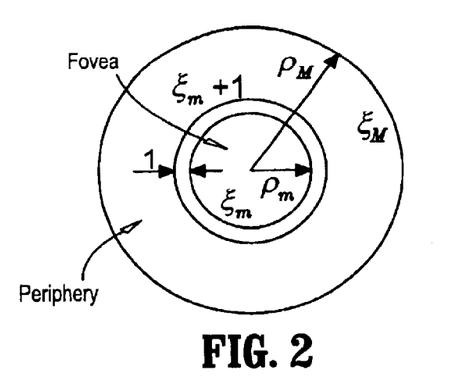
FIG. 2 is a diagram illustrating a log-polar mapping representation according to an embodiment of the present invention.

A log-polar mapping according to the present invention is based on the following transformation:

$$\begin{cases} \rho = A\lambda^\xi - B \\ \theta = \theta_0 \phi \end{cases} \quad (3)$$

where $(\xi, \phi)$ are positive integers representing the log-polars coordinates, $\lambda > 1$ is the base of the transformation, and A, B, and $\theta_0$ are constants that are derived from geometric constraints. The coordinate $\xi$ represents the index of rings whose radius increases exponentially, while $\phi$ denotes equidistant radii starting from origin. The geometric constraints of the log-polar mapping representation will now be described in detail with reference to FIG. 2.

(i) Geometric Constraint for Rings

Referring to FIG. 2, let $\xi_m$ and $\xi_M$ denote the smallest and largest ring, $\rho_m$ and $\rho_M$ their radii, respectively, and $\xi_p = \xi_M - \xi_m$ the number of rings that cover the periphery. The $\xi_m$-th ring is the border between the fovea and periphery.

In a preferred embodiment, the fovea is represented with full resolution. Thus, a natural geometric constraint is that the radius difference between the ring $\xi_m+1$ and $\xi_m$ is equal to one. Using this constraint, as illustrated below, $\lambda$ is the real root of the polynomial of order $\xi_p-1$:

$$g(\lambda) = \lambda^{\xi_p-1} + \lambda^{\xi_p-2} + \ldots + 1 - (\rho_M - \rho_m). \quad (4)$$

When $\xi_p < \rho_M - \rho_m$, the polynomial $g(\lambda)$ has as root larger than 1.

Based on the same constraint, the constant B is:

$$B = \frac{1}{\lambda - 1} - \rho_m \quad (5)$$

and by forcing the ring indices to start from zero (i.e., $\xi_m = 0$, hence $\xi_p = \xi_M$) we get:

$$A = \frac{1}{\lambda - 1} \quad (6)$$

Introducing now (5) and (6) in (3), we have $$\rho = \rho_m + \frac{\lambda^\xi - 1}{\lambda - 1} \quad (7)$$

(ii) Geometric Constraint for Radii

Figure 3A:
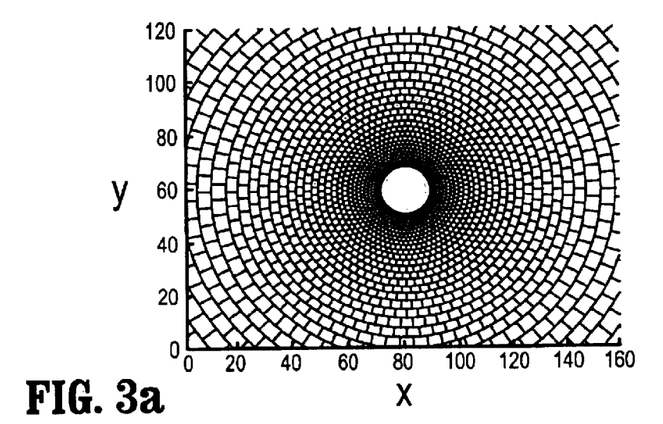
FIG. 3(a) is an exemplary diagram illustrating log-polar pixels for an image of 160×120 pixels using a log-polar model according to the present invention.

The parameter $\theta_0$ is derived such that the resulting sampling grid (defined by the centers of the log-polar pixels) has locally a hexagonal lattice structure. In other words, referring to FIG. 3a, the sampling grid construction assumes the rotation of each other pixel ring by $\theta_0/2$. Preferably, to obtain a structure that is locally hexagonal, the aspect ratio of the log-polar pixels should be $\sqrt{3}/2$, that is, the centers of three adjacent pixels preferably form an equilateral triangle. It is to be understood that the aspect ratio changes with the index of the ring, however, for typical parameter values the changes are negligible. By enforcing the hexagonal constraint for the pixels at the half of the periphery region ($\xi_h = \xi_M/2$), it can be shown after some trigonometric manipulations that:

$$\theta_0 = 2\arctan\frac{2}{\sqrt{3}} \frac{\lambda^{\xi_h} - \lambda^{\xi_h-1}}{\lambda^{\xi_h} + \lambda^{\xi_h-1} - 2 + 2\rho_m(\lambda - 1)} \quad (8)$$

(iii) Mapping Design

Figure 3B:
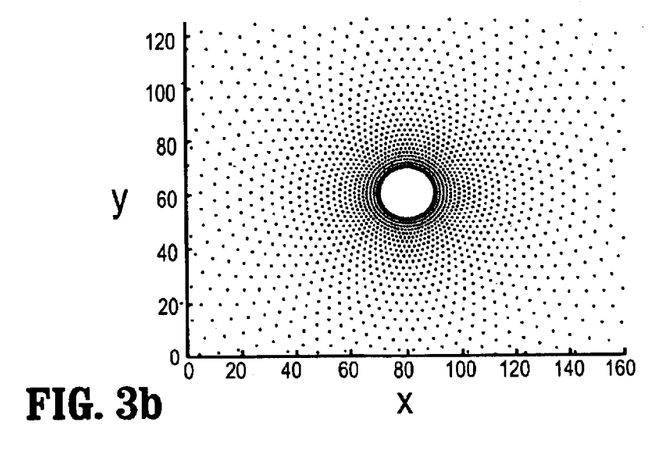
FIG. 3(b) is an exemplary diagram illustrating a sampling grid corresponding to the log-polar pixels of FIG. 3(a)

According to the above formulation, the log-polar grid is completely specified if the number of rings $\xi_M$ is given, together with the radius of fovea region $\rho_m$ and the maximum radius of the periphery $\rho_M$. For example, FIGS. 3(a) and 3(b) respectively illustrate the log-polar pixels and the sampling grid corresponding to an image of 160×120 pixels, wherein the number of rings $\xi_M = 30$, the fovea radius $\rho_m = 9$, and a maximum periphery radius $\rho_M = 100$, equal to half of the image diagonal. Solving for the real root of polynomial (4) with $\xi_p = \xi_M$, it results that $\lambda = 1.068$ and using (8) we have $\theta_0 = 0.0885$ radians.

Moreover, the number of log-polar pixels is $$b = \xi_M * \left\lceil \frac{2\pi}{\theta_0} \right\rceil = 30 \times 71 = 2130$$

pixels, which is 9 times smaller than the number of Cartesian pixels (the notation $\lceil \cdot \rceil$ denotes the ceiling function). When the foveation point does not coincide with the image center, the number of log-polar pixels decreases.

Advantageously, the sampling grid employed to compute the log-polar representation has locally a hexagonal lattice structure shown to be about 13.4% more efficient than rectangular lattices in the case of circularly band-limited signals.

(iv) Derivation of Parameters

The following provides a derivation of the base $\lambda$ and the constants A and B of the transformation:

$$\rho = A\lambda^{\xi_6} - B. \tag{A.1}$$

By imposing a unit difference between the radii of the rings $\xi_m+1$ and $\xi_m$, we have:

$$A\lambda^{\xi_{m+1}} - A\lambda^{\xi_m} = 1 \tag{A.2}$$

which gives:

$$A\lambda^{\xi_m} = \frac{1}{\lambda - 1} \tag{A.3}$$

Using now (A.3) in:

$$\rho_m = A\lambda^{\xi_m} - B \tag{A.4}$$

results in:

$$B = \frac{1}{\lambda - 1} - \rho_m \tag{A.5}$$

To obtain $\lambda$, (A.5) is introduce in (A.1) and the expression of the largest periphery ring is written:

$$\rho_M = A\lambda^{\xi_M} + \rho_m - \frac{1}{\lambda - 1} \tag{A.6}$$

which is equivalent to:

$$\rho_M - \rho_m = A\lambda^{\xi_m}\lambda^{\xi_M - \xi_m} - \frac{1}{\lambda - 1} \tag{A.7}$$

Using (A.3) in (A.7) and noting that $\xi_p = \xi_M - \xi_m$, we obtain that $\lambda$ is the real root of the polynomial $g(\lambda)$ expressed by (4). By imposing that the ring indices start at $\xi_m = 0$ the constant A results as:

$$A = \frac{1}{\lambda - 1} \tag{A.8}$$

Figure 4:
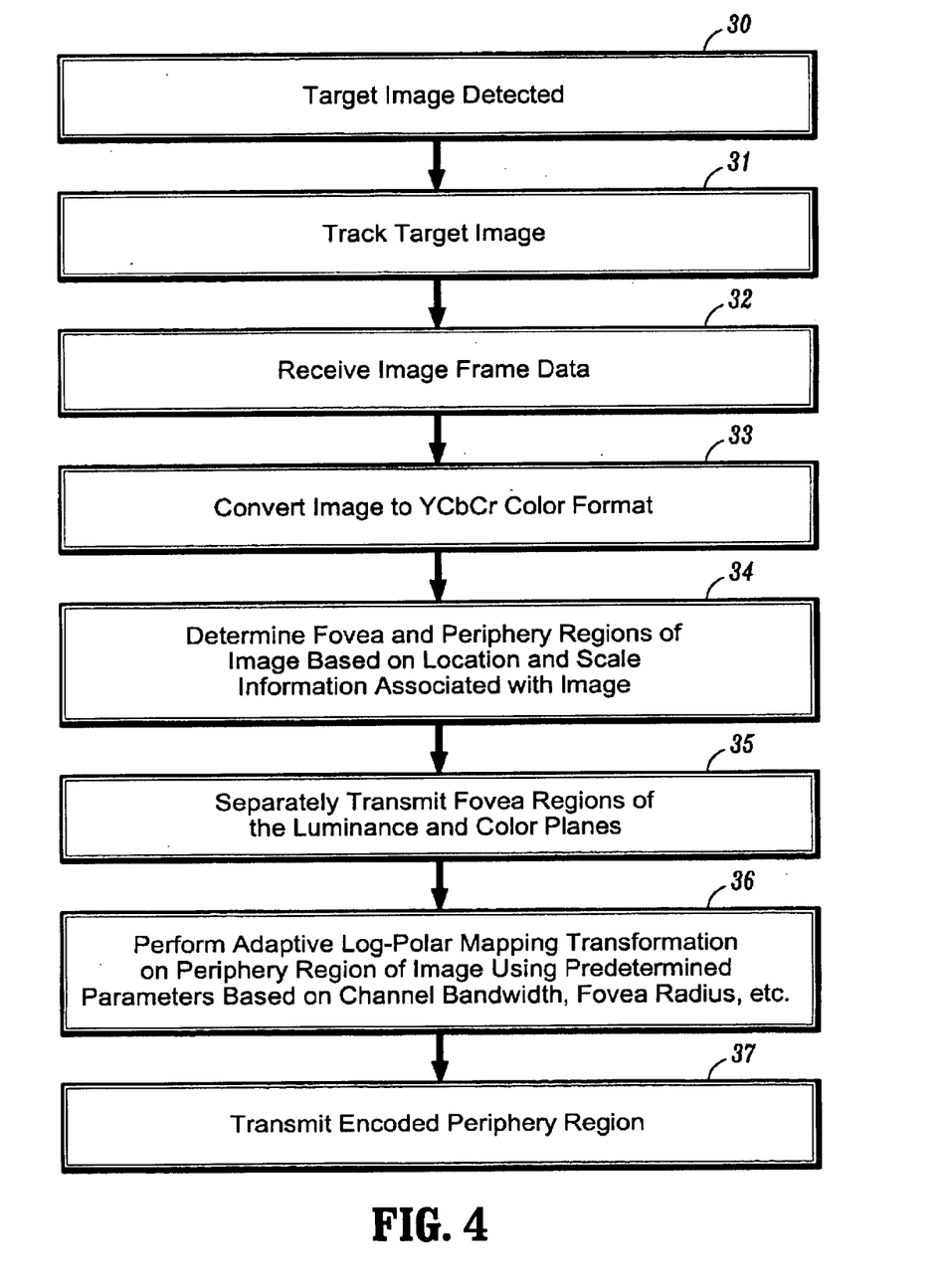
FIG. 4 is a flow diagram illustrating a method for processing image data according to one aspect of the present invention.

FIG. 4 is a flow diagram that illustrates a method for processing image data according to one aspect of the present invention. More specifically, FIG. 4 illustrates a mode of operation of the image server described above. It is to be appreciated that the system provides approximately constant transmission bandwidth. This is achieved by transmitting with full resolution the fovea region (e.g., detected face), while encoding the periphery region (background) using an adaptive log-polar mapping that adjusts the transmission resolution for the periphery according to the remaining bandwidth of the communication channel.

Referring now to FIG. 4, the image server will be in wait state until a target image is detected (step 30). As noted above, any suitable method may be employed to perform this task. Upon detection, the target image will be tracked (step 31). Again, any suitable method may be employed to perform the tracking process.

In the case when active cameras are used, the adequate control of the pan, tilt and zoom is an important phase of the tracking process. Preferably, the image server controls the camera by executing fast saccades in response to sudden and large movements of the target while providing a smooth pursuit when the target is quasi-stationary. In other words, a type of control is preferred which resembles that of the human visual system. Further, the fovea sub image preferably occupies laterally about 6 degrees of the camera's 50 degrees field of view at zero zoom.

In contrast to conventional tracking systems that suspend the processing of visual information during the saccades movements, the system described herein is sufficiently robust to deal with the large amount of blurring resulting from camera motion. As a result, visual tracking is preferably a continuous process that is not interrupted by the servo commands.

As the system tracks a detected target image, the image server receives (step 32) and encodes image data for each frame. Preferably, an input image of size 320×240 is first converted to the well-known YcbCr color format, the color planes preferably being sub-sampled to 160×120 pixels (step 33). The image data is processed using a log-polar transformation and the fovea regions of the luminance and color planes of the image are determined based on the location and scale information associated with the image (step 34) (i.e., the information derived from the tracking process). By separating the fovea region from the periphery region, the fovea regions of the luminance and color planes can be transmitted separately (step 35) at full resolution. More specifically, in a preferred embodiment, the 2-D representation of the image data (received from the detection and tracking module), which corresponds to the fovea region, is transmitted at full resolution.

The periphery region of the image, however, is processed using an adaptive log-polar mapping (e.g., anti-aliasing filtering, sampling and interpolation) using predetermined parameters based on the radius of the fovea region and/or the detected channel bandwidth (step 36). By way of example, if the bandwidth of the communication channel is known in advance, the log-polar mapping has only one variable parameter, i.e., the radius of the fovea region (the number of rings being constrained by the bandwidth). Again, the ides is to transmit with full resolution the detected face (fovea region) while adapting the log-polar mapping for the remaining bandwidth of the communication channel. Since the dependence between the number of log-polar pixels and the input parameters (e.g., parameters A, B, $\theta_0$) of the mapping is complex, as noted above, the LUTs are used to determine the encoding input parameters for a given bandwidth and/or fovea size. In a preferred embodiment, by quantizing the range of values of the fovea radius, for each radius value a set of LUTs is built comprising the parameters for the anti-aliasing filtering, sampling, and interpolation processes.

The encoded periphery region is then transmitted to the target receiver (step 37). Advantageously, by selecting in real-time the different encoding parameters based on, e.g., the detected bandwidth and/or the radius of the fovea region, the system can maintain the transmission bandwidth at an approximately constant level, while allowing the full resolution transmission of the detected face (fovea region), independent of the scale. The penalty is paid by the periphery region (background) whose quality decreases when, e.g., the face scale increases.

IV. Experimental Results

Figure 5:
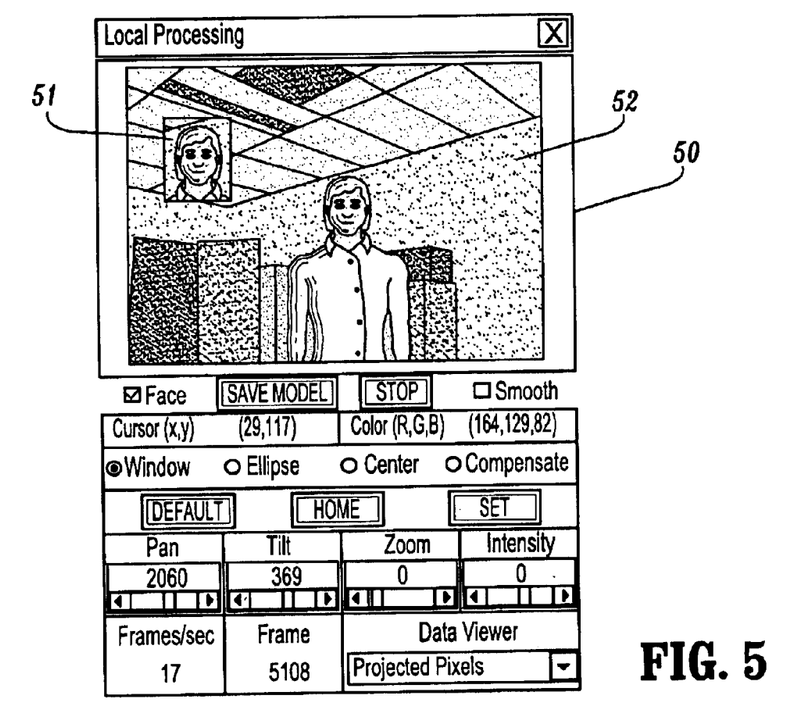
FIG. 5 is an exemplary diagram of a graphic user interface for an image server according to an embodiment of the present invention, showing a detected face in the image field.
Figure 6:
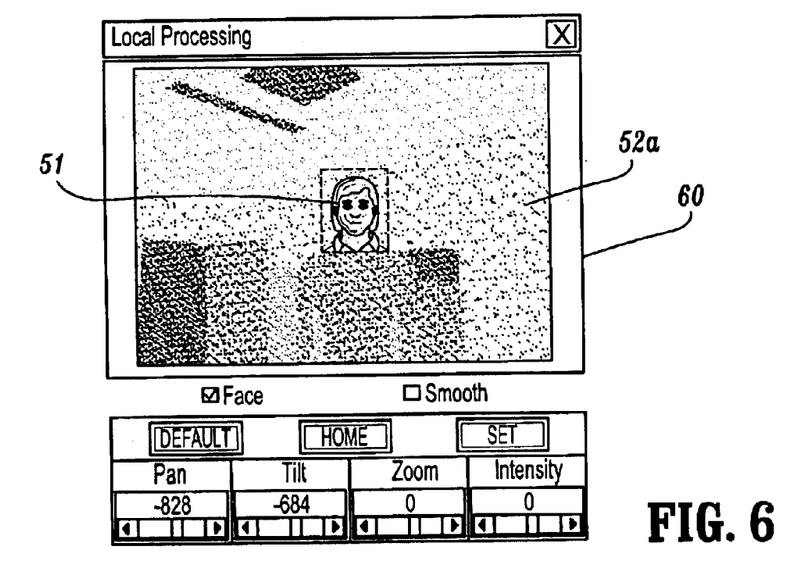
FIG. 6 is an exemplary diagram of a graphic user interface for a client central processing unit according to an embodiment of the present invention, showing a reconstructed image.

For all the experiments described below, an overall compression ratio of 16 was imposed. FIG. 5 depicts an exemplary user interface 50 of an image server, showing a detected face 51 in the upper-left side of the image 52. FIG. 6 depicts an exemplary user interface 60 of a client (e.g., central processing unit) and the reconstructed image 52a. The client application is able to remotely control the camera. As shown, the present invention advantageously allows preservation of the details on the face region (i.e., region 51) in the reconstructed image 52a.

Figure 7:
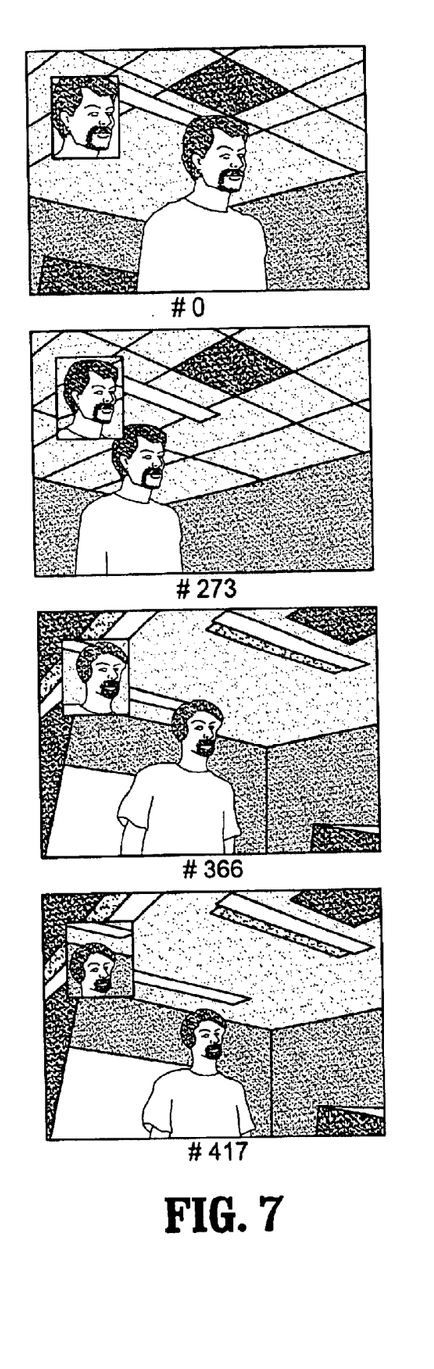
FIG. 7 is an exemplary diagram illustrating frames of a video sequence of a subject that is detected and tracked by an image server.
Figure 8:
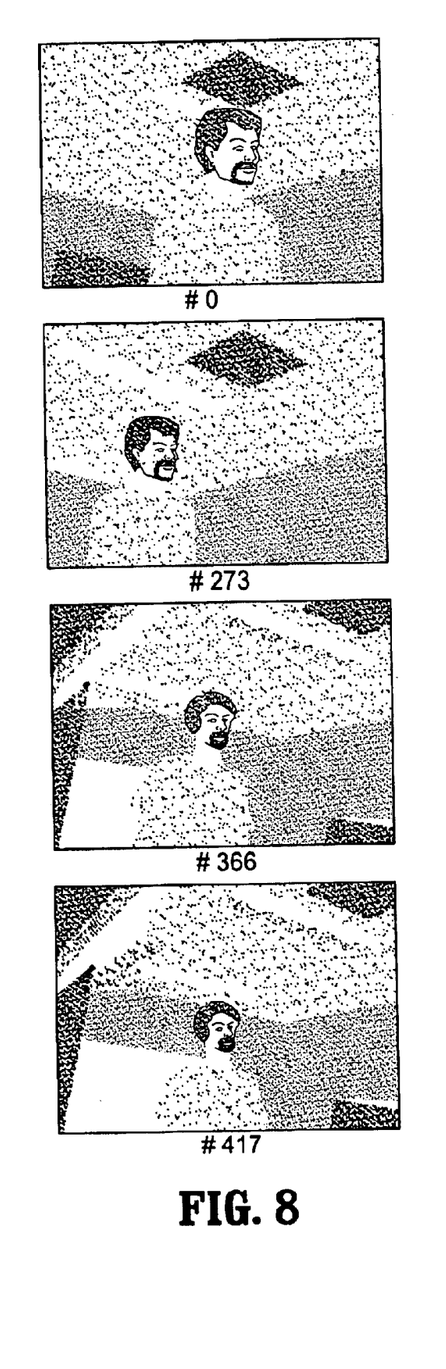
FIG. 8 is an exemplary diagram illustrating reconstructed images of the frames in FIG. 7 using a client application.

FIG. 7 illustrates 4 frames (#0, #273, #366 and #417) of a sequence of about 500 frames containing the detection and tracking of an individual that enters an office, wherein the detected face (fovea region) is shown in the upper-left side of each image. FIG. 8 depicts the same frames reconstructed by the client application. Again, note the preservation of the resolution of the detected face of interest, as opposed to the lower resolution of the background. For visualization purposes, both sequences (FIG. 7, FIG. 8) were captured in real-time, simultaneously, on the same computer. The transmission mechanism was implemented through serializable Java classes. Note that the acquisition was performed at a low frame rate (about 1 fps) and some visible artifacts were introduced during this process.

According to the experiments, when the complete system (detection, tracking, efficient representation, transmission, reconstruction, and visualization) operates on a single computer (600 MHz, PC), the tracking rate reduces to 17–20 fps. The rate at which the data is received at the client site is about 6 fps, which corresponds to an instantaneous bandwidth of about 0.6 MHz, when the compression factor is set to 16. This results are very encouraging, taking into account both the spatial and temporal redundant information present in the log-polar data.

In summary, the present invention provides a framework for the intelligent processing of visual data for low bandwidth communication, with an exemplary application in distributed surveillance. Advantageously, the detected region of interest (target) from the current image frame can be transmitted with high resolution and approximately constant bit rate. To compensate for bit rate variations due to the changes in the target scale and/or channel bandwidth, for example, the representation quality of the background is advantageously modified through the adaptive log-polar mapping.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for encoding image data for transmission over a communication channel, comprising the steps of:
   receiving image data;
   encoding the image data using an adaptive log-polar mapping protocol that generates a log-polar representation of the image data comprising a fovea region and periphery region, wherein the encoding comprises selecting encoding parameters for the log-polar mapping based on either the size of the fovea region, the channel bandwidth, or both, to modify the resolution of the image data within the periphery region; and
   transmitting the image data within the fovea region at full resolution and the image data within the periphery region at the modified resolution.

2. The method of claim 1, wherein the step of encoding comprises dynamically modifying the transmission resolution of the image data within the periphery region, if necessary, to compensate for a bit rate variation due to either a change in the size of the fovea region, the bandwidth of the communication channel or both.

3. The method of claim 2, wherein the step of dynamically modifying comprises maintaining the transmission bandwidth of the encoded image data at a substantially constant rate.

4. The method of claim 1, wherein the encoding step utilizes a sampling grid comprising a hexagonal lattice framework.

5. The method of claim 1, wherein the step of selecting encoding parameters comprises accessing predetermined encoding parameters stored in a LUT (look-up table) based on a radius measure of the fovea region.

6. The method of claim 1, comprising the step of detecting and tracking a target image within the image data, wherein the target image is tracked within the fovea region of the image data.

7. A program storage device readable by a machine, tangibly embodying a program of instructions executable by the machine to perform method steps for encoding image data for transmission over a communication channel, the method steps comprising:
   receiving image data;
   encoding the image data using an adaptive log-polar mapping protocol that generates a log-polar representation of the image data comprising a fovea region and periphery region, wherein the encoding comprises selecting encoding parameters for the log-polar mapping based on either the size of the fovea region, the channel bandwidth, or both, to modify the resolution of the image data within the periphery region; and
   transmitting the image data within the fovea region at full resolution and the image data within the periphery region at the modified resolution.

8. The program storage device of claim 7, wherein the instructions for encoding comprise instructions for dynamically modifying the transmission resolution of the image data within the periphery region, if necessary, to compensate for a bit rate variation due to either a change in the size of the fovea region, the bandwidth of the communication channel or both.

9. The program storage device of claim 8, wherein the instructions for dynamically modifying comprise instructions for maintaining the transmission bandwidth of the encoded image data at a substantially constant rate.

10. The program storage device of claim 7, wherein the encoding utilizes a sampling grid comprising a hexagonal lattice framework.

11. The program storage device of claim 7, wherein the instructions for selecting encoding parameters comprise instructions for accessing predetermined encoding parameters stored in a LUT (look-up table) based on a radius measure of the fovea region.

12. The program storage device of claim 7, comprising instructions for detecting and tracking a target image within the image data, wherein the target image is tracked within the fovea region of the image data.

13. A method for providing distributed surveillance over a communications network, comprising the steps of:
- detecting the presence of an individual in a predetermined field of view;
- tracking the face of the individual within the field of view;
- generating image data, the image data comprising two-dimensional coordinates and estimated scale of the individual's face being tracked;
- filtering and sampling the image data using a log-polar mapping to generate encoded image data comprising a fovea region and periphery region, the fovea region being centered on the face of the individual; and
- transmitting the encoded image data over a communication channel at a predetermined transmission bit rate, the fovea region being transmitted at full resolution;
- wherein the log-polar mapping of the periphery region is adapted based on scale and locations changes of the fovea region to substantially maintain the predetermined transmission bit rate.

14. The method of claim 13, wherein the method steps are executed by an image server.

15. The method of claim 14, wherein the step of transmitting comprises transmitting the encoded image data to a client at a central location.

16. The method of claim 15, further comprising the steps of:
- reconstructing an image from the encoded image data by applying an inverse log-polar mapping; and
- performing biometric identification using the reconstructed image to identify the individual.

17. A client/server system, comprising:
- an image sever, operatively interfaced to a camera, the image server comprising
  - an encoder for filtering and sampling image data received from the camera using a log-polar mapping to generate encoded image data comprising a fovea region and periphery region, the fovea region being centered on a target of interest in the image; and
  - a communication stack for transmitting the encoded image data over a communication channel at a predetermined bit rate, wherein the fovea region is transmitted at full resolution, and wherein the log-polar mapping of the periphery region is adapted based on scale and locations changes of the fovea region to substantially maintain the predetermined transmission bit rate; and
- a client for receiving the encoded image data transmitted from the image server and decoding the encoded image data for identification of the target of interest.

18. The system of claim 17, wherein the system is employed for distributed surveillance over a network.

19. The system of claim 17, wherein the system is employed for videoconferencing over a network.

20. The system of claim 17, wherein the system is employed for industrial inspection.

* * * * *